Patented Oct. 11, 1938

2,132,679

UNITED STATES PATENT OFFICE 2,132,679

ESTERS OF GLYCOL ETHERS

Henry L. Cox and Thomas F. Carruthers, South Charleston, W. Va., assignors, by mesne assignments, to Union Carbide and Carbon Corporation, a corporation of New York No Drawing. Application May 4, 1934.
Serial No. 723,902

8 Claims. (Cl. 106—37)

The invention relates to compositions of matter comprising esters of glycol mono-alkyl ethers. It has particular reference to the compounds formed by the reaction of an aromatic monocarboxylic acid, such as salicylic acid, with a glycol mono-alkyl ether, in which the substituted alkyl group contains more than two carbon atoms.

The salicylates of the monobutyl ethers of ethylene glycol and diethylene glycol are typical of the esters covered by the invention. These compounds may be prepared as indicated in the following examples.

Example 1

A mixture of 590 grams (5 mols) of ethylene glycol monobutyl ether and 552 grams (4 mols) of salicylic acid was heated in the presence of 2 grams of sulfuric acid as a catalyst. Heating was continued for 13¾ hours at a temperature of 130°–172° C., during which period 72 grams of water were removed with benzene in the usual manner. The crude reaction product was neutralized by stirring with a soda ash solution, washed with water, and finaly distilled under reduced pressure. A mid-cut boiling at 159°–163° C. at 8–10 mm. pressure was collected. This product was a water-white liquid of pleasant odor, having a specific gravity of 1.0796 at 20/20° C., and a refractive index of 1.8025 at 20° C. Its molecular weight corresponded to the compound butoxyethyl salicylate.

Example 2

In substantially the same manner as above, 2918 grams (18 mols) of diethylene glycol monobutyl ether was reacted with 2070 grams (15 mols) of salicylic acid in the presence of 30 grams of sulfuric acid. The reaction required 7⅔ hours at a temperature of 143°–158° C., and during this time 292 grams of water was removed. The crude product was neutralized, washed, and distilled under reduced pressure. A mid-cut boiling at 175° C. at 3 mm. pressure was collected. This product was a faintly yellow liquid, with a slight but pleasant odor, having a specific gravity of 1.078 at 20/20° C., and a molecular weight indicating the compound butoxyethoxyethyl salicylate.

The above examples are representative of many similar compounds within the scope of the invention. The monopropyl ethers of ethylene or diethylene glycol, or etheralcohols higher than the butyl derivative, will also react in a similar manner to produce valuable esters. Other acids than salicylic, within the class of aromatic monocarboxylic acids, may likewise be esterified with these glycol ethers.

The new esters are characterized by a high boiling point and low vapor pressure. They have good stability, and are useful as solvents and plasticizers for cellulose esters, other cellulose derivatives, and many of the natural and synthetic resins and gums commonly used in the compounding of plastic coating and impregnating compositions. These, and other properties, make the esters especially well adapted for use as plasticizers in paints, varnishes, lacquers, and the like, as a means for promoting film flexibility. The actual amount of ester most suitable for a particular lacquer composition may be readily determined, and will vary with the other ingredients of the lacquer, and the manner of its use.

We claim:

1. As a new compound, a salicylic acid ester of a glycol mono-alkyl ether in which the substituted alkyl group contains more than two carbon atoms.

2. As a new compound, a salicylic acid ester of a mono-alkyl ether of ethylene glycol, in which the substituted alkyl group contains more than two carbon atoms.

3. As a new compound, a salicylic acid ester of a mono-alkyl ether of diethylene glycol, in which the substituted alkyl group contains more than two carbon atoms.

4. As a new compound, a salicylic acid ester of ethylene glycol monobutyl ether.

5. As a new compound, a salicylic acid ester of diethylene glycol monobutyl ether.

6. A composition of matter comprising a plastic material of the group consisting of cellulose derivatives and natural and synthetic gums and resins, plasticized with a salicylic acid ester of a glycol mono-alkyl ether, in which the substituted alkyl group contains more than two carbon atoms.

7. A composition of matter comprising a cellulose derivative plasticized with a salicylic acid ester of ethylene glycol monobutyl ether.

8. A composition of matter comprising a cellulose derivative plasticized with a salicylic acid ester of diethylene glycol monobutyl ether.

HENRY L. COX.
THOMAS F. CARRUTHERS.